United States Patent
Guan et al.

(10) Patent No.: US 12,236,345 B2
(45) Date of Patent: Feb. 25, 2025

(54) FEW-SHOT LEARNING FOR MULTI-TASK RECOMMENDATION SYSTEMS

(71) Applicant: Accenture Global Solutions Limited, Dublin (IE)

(72) Inventors: Lan Guan, Johns Creek, CA (US); Guanglei Xiong, Pleasanton, CA (US); Christopher Yen-Chu Chan, Jersey City, NJ (US); Jayashree Subrahmonia, San Jose, CA (US); Aaron James Sander, Silver Spring, MD (US); Sukryool Kang, Dublin, CA (US); Wenxian Zhang, San Jose, CA (US); Anwitha Paruchuri, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 924 days.

(21) Appl. No.: 17/350,460

(22) Filed: Jun. 17, 2021

(65) Prior Publication Data
US 2022/0300804 A1    Sep. 22, 2022

Related U.S. Application Data

(60) Provisional application No. 63/164,152, filed on Mar. 22, 2021.

(51) Int. Cl.
*G06N 3/08* (2023.01)
*G06N 3/04* (2023.01)

(52) U.S. Cl.
CPC .............. *G06N 3/08* (2013.01); *G06N 3/04* (2013.01)

(58) Field of Classification Search
None
See application file for complete search history.

(56) References Cited

U.S. PATENT DOCUMENTS 10,509,814 B2 * 12/2019 Lastra Diaz ...... G06F 16/24522
10,607,252 B2 *  3/2020 Allouche .......... G06Q 10/0639
(Continued)

OTHER PUBLICATIONS

Zhang et al., "Collaborative Knowledge Base Embedding for Recommender System", 22nd ACM SIGKDD International Conference, Aug. 13-17, 2016, pp. 353-363 (Year: 2016).*

(Continued)

*Primary Examiner* — Paulinho E Smith
(74) *Attorney, Agent, or Firm* — Polsinelli PC

(57) ABSTRACT

Implementations are directed to receiving a set of tuples, each tuple including an entity and a product from a set of products, for each tuple: generating, by an embedding module, a total latent vector as input to a recommender network, the total latent vector generated based on a structural vector, a textual vector, and a categorical vector, each generated based on a product profile of a respective product and an entity profile of the entity, generating, by a context integration module, a latent context vector based on a context vector representative of a context of the entity, and inputting the total latent vector and the latent context vector to the recommender network, the recommender network being trained by few-shot learning using a multi-task loss function, and generating, by the recommender network, a prediction including a set of recommendations specific to the entity.

24 Claims, 8 Drawing Sheets

(56) References Cited

U.S. PATENT DOCUMENTS

| | | | | |
|---|---|---|---|---|
| 10,902,571 | B2* | 1/2021 | Naruniec | G06N 3/045 |
| 2019/0303836 | A1* | 10/2019 | Goyal | G06Q 10/063112 |
| 2021/0216881 | A1* | 7/2021 | McCarthy | G06F 18/22 |
| 2022/0300804 | A1* | 9/2022 | Guan | G06N 3/08 |
| 2023/0351153 | A1* | 11/2023 | Zhao | G06N 3/042 |

OTHER PUBLICATIONS

Lee et al., "MeLU: Meta-Learned User Preference Estimator for Cold-Start Recommendation", Jul. 31, 2019, arXiv, pp. 1-10 (Year: 2019).*

Devlin et al., "BERT: Pre-training of Deep Bidirectional Transformers for Language Understanding," arXiv, May 24, 2019, arXiv:1810.04805v2, 16 pages.

Fei-Fei et al., "One-Shot Learning of Object Categories," IEEE Transactions on Pattern Analysis and Machine Intelligence, Apr. 2006, 28(4):594-611.

Fink, "Object Classification from a Single Example Utilizing Class Relevance Metrics," Presented at Proceedings of Advances in Neural Information Processing Systems 17 (NIPS 2004), Dec. 13-18, 2004, Vancouver, British Columbia, Canada, 8 pages.

Finn et al., "Model-Agnostic Meta-Learning for Fast Adaptation of Deep Networks," arXiv, Jul. 18, 2017, arXiv:1703.03400v3, 13 pages.

Jin et al., "Power up! Robust Graph Convolutional Network against Evasion Attacks based on Graph Powering," arXiv, May 24, 2019, arXiv:1905.10029v1, 16 pages.

Wang et al., "Generalizing from a Few Examples: A Survey on Few-Shot Learning," ACM Computing Surveys, Mar. 2020, 53(3):63, 34 pages.

AU Office Action in Australian Appln. No. 2022201870, dated Aug. 5, 2022, 4 pages.

Crawshaw et al., "Multi-task learning with deep neural networks: A survey," arXiv, Sep. 10, 2020, arXiv:2009.09796v1, 43 pages.

Lee et al., "MeLU: Meta-Learned User Preference Estimator for Cold-Start Recommendation," arXiv, Jul. 31, 2019, arXiv:1908.00413v1, 10 pages.

Unger et al., "Towards latent context-aware recommendation systems," Knowledge-Based Systems, Jul. 15, 2016, 104:165-178.

Wang et al., "Multi-Task Feature Learning for Knowledge Graph Enhanced Recommendation," arXiv, Jan. 23, 2019, arXiv:1901.08907v1, 11 pages.

Zhang et al., "Collaborative Knowledge Base Embedding for Recommender Systems," Presented at Proceedings of the 22nd ACM SIGKDD International Conference on Knowledge Discovery and Data Mining, Aug. 13-17, 2016, San Francisco, CA, USA, 353-362.

AU Office Action in Australian Appln. No. 2022201870, dated Mar. 28, 2023, 4 pages.

Ruder, "An Overview of Multi-Task Learning in Deep Neural Networks," CoRR, submitted on Jun. 15, 2017, arXiv:1706.05098v1, 14 pages.

Office Action in Indian Appln. No. 202214014265, dated Nov. 25, 2022, 7 pages.

\* cited by examiner

FEW-SHOT LEARNING FOR MULTI-TASK RECOMMENDATION SYSTEMS

CROSS-REFERENCE TO RELATED APPLICATION

This application claims priority to U.S. Prov. App. No. 63/164,152, filed on Mar. 22, 2021, the disclosure of which is expressly incorporated herein by reference in the entirety.

BACKGROUND

Enterprises execute operations in connected environments that can include a network of multiple enterprises and customers. For example, and among other contexts, enterprises can operate in a business-to-business (B2B) context, in which enterprises provide goods and/or services to other enterprises. Enterprises leverage technologies in support of ongoing enterprise operations. An example technology includes computer-implemented recommender systems (also referred to as recommendation systems) that ingest input data and provide output data representative of one or more recommendations. For example, an enterprise can leverage a recommender system to identify products and/or services that may be relevant to its operations (e.g., products/services the enterprise can procure from other enterprises in the B2B context). Traditionally, recommender systems are provided as machine learning (ML) systems that process input data through one or more ML models to provide output data representative of one or more recommendations. However, traditional recommender systems suffer from technical disadvantages.

For example, recommender systems do not support automatic profile creation for enterprises and, instead, depend on third-party data sources, which are static and not holistic. This results in diminished accuracy in ML model performance leading to sub-optimal recommendations. As another example, a data sparseness problem is present. For example, traditional recommender systems rely on large amount of training data representative of historical interactions between products and customers (i.e., products purchased by customers), but such training data may be lacking, incomplete, and/or noisy. Traditional ML models may easily overfit due to incomplete and noisy training data and the resulting predictions are sub-optimal. This highlights the so-called cold start problem, meaning that a recommender system cannot draw any inferences for customers or products about which it has not yet gathered sufficient training data. Further, B2B recommendation scenarios are usually subject to changing context related to technological, organizational, and marketplace influential factors that can significantly affect predictions. ML models of traditional recommender systems do not incorporate this dynamic context making the ML models sub-optimal. As still another example, requirements are very dynamic in B2B contexts (e.g., brand promotion, product cross-/up-selling, etc.) and traditional recommender systems are incapable of or have limited capabilities in providing recommendations based on different optimization goals and scenarios (e.g., contribution margin, coverage, revenue, etc.) and/or combinations thereof.

SUMMARY

Implementations of the present disclosure are generally directed to a recommender system that enables rapid integration of recommendation solutions. More particularly, implementations of the present disclosure are directed to a recommender system that enables web crawling and utilization of third-party data connectors, executes machine learning (ML) model training and builds ML or deep learning (DL) models for various recommendation use cases in the business-to-business (B2B) context.

In some implementations, actions include receiving a set of tuples, each tuple including an entity and a product from a set of products, for each tuple: generating, by an embedding module, a total latent vector as input to a recommender network, the total latent vector generated based on a structural vector, a textual vector, and a categorical vector, each generated based on a product profile of a respective product and an entity profile of the entity, generating, by a context integration module, a latent context vector based on a context vector representative of a context of the entity, and inputting the total latent vector and the latent context vector to the recommender network, the recommender network being trained by few-shot learning using a multi-task loss function, and generating, by the recommender network, a prediction including a set of recommendations specific to the entity. Other implementations of this aspect include corresponding systems, apparatus, and computer programs, configured to perform the actions of the methods, encoded on computer storage devices.

These and other implementations can each optionally include one or more of the following features: the recommender network includes multiple output layers, each output layer corresponding to a respective task and including parameters that are optimized for the respective task during few-shot learning; the multi-task loss function includes a set of loss functions, each loss function corresponding to a respective task in a set of tasks; the recommender network includes a concatenation layer to concatenate the total latent vector and the latent context vector to provide a concatenated vector for processing through a set of intermediate layers; the embedding module includes a structural embedding module that generates a structural vector for a respective tuple by processing structural data of the product profile and the entity profile; the embedding module includes a textual embedding module that generates a textual vector for a respective tuple by processing textual data of the product profile and the entity profile; the embedding module includes an encoding module that generates a categorical vector for a respective tuple by processing category data of the product profile and the entity profile; generating a latent context vector includes inputting the context vector to an auto-encoder, and outputting the latent context vector from an intermediate layer of the auto-encoder; the latent context vector has fewer dimensions than the context vector; and the total latent vector is further based on an offset vector provided as a baseline representation of the entity.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

Like reference numbers and designations in the various drawings indicate like elements.

DETAILED DESCRIPTION

Figure 1:
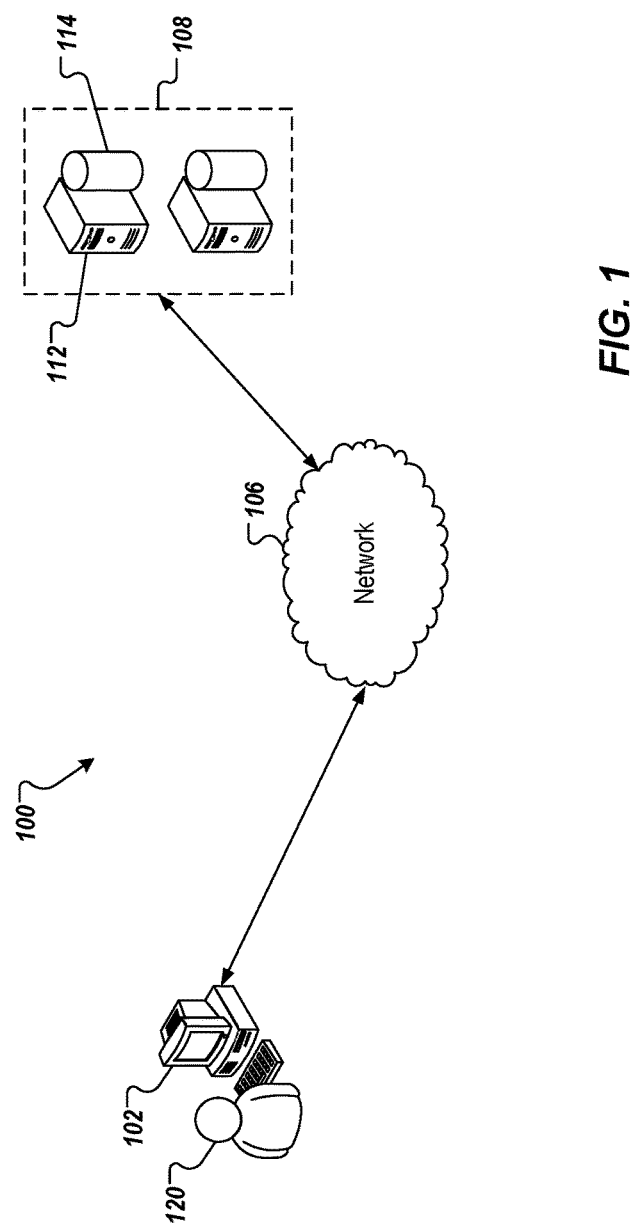
FIG. 1 depicts an example system that can execute implementations of the present disclosure.

Implementations of the present disclosure are generally directed to a recommender system that enables rapid integration of recommendation solutions. More particularly, implementations of the present disclosure are directed to a recommender system that enables web crawling and utilization of third-party data connectors, executes machine learning (ML) model training and builds ML or deep learning (DL) models for various recommendation use cases in the business-to-business (B2B) context.

In some implementations, actions include receiving a set of tuples, each tuple including an entity and a product from a set of products, for each tuple: generating, by an embedding module, a total latent vector as input to a recommender network, the total latent vector generated based on a structural vector, a textual vector, and a categorical vector, each generated based on a product profile of a respective product and an entity profile of the entity, generating, by a context integration module, a latent context vector based on a context vector representative of a context of the entity, and inputting the total latent vector and the latent context vector to the recommender network, the recommender network being trained by few-shot learning using a multi-task loss function, and generating, by the recommender network, a prediction including a set of recommendations specific to the entity.

To provide context for implementations of the present disclosure, and as introduced above, enterprises execute operations in connected environments that can include a network of multiple enterprises and customers. For example, and among other contexts, enterprises can operate in the B2B context, in which enterprises provide goods and/or services to other enterprises. Enterprises leverage technologies in support of ongoing enterprise operations. An example technology includes computer-implemented recommender systems (also referred to as recommendation systems) that ingest input data and provide output data representative of one or more recommendations. For example, an enterprise can leverage a recommender system to identify products and/or services that may be relevant to its operations (e.g., products/services the enterprise can procure from other enterprises in the B2B context). Traditionally, recommender systems are provided as ML systems that process input data through one or more ML models to provide output data representative of one or more recommendations. However, traditional recommender systems suffer from technical disadvantages.

For example, recommender systems do not support automatic profile creation for enterprises and, instead, depend on third-party data sources, which are static and not holistic. This results in diminished accuracy in ML model performance leading to sub-optimal recommendations. As another example, a data sparseness problem is present. For example, traditional recommender systems rely on large amount of training data representative of historical interactions between products and customers (i.e., products purchased by customers), but such training data may be lacking, incomplete, and/or noisy. Traditional ML models may easily overfit due to incomplete and noisy training data and the resulting predictions are sub-optimal. This highlights the so-called cold start problem, meaning that a recommender system cannot draw any inferences for customers or products about which it has not yet gathered sufficient training data. Further, B2B recommendation scenarios are usually subject to changing context related to technological, organizational, and marketplace influential factors that can significantly affect predictions. ML models of traditional recommender systems do not incorporate this dynamic context making the ML models sub-optimal. As still another example, requirements are very dynamic in B2B contexts (e.g., brand promotion, product cross-/up-selling, etc.) and traditional recommender systems are incapable of or have limited capabilities in providing recommendations based on different optimization goals and scenarios (e.g., contribution margin, coverage, revenue, etc.) and/or combinations thereof.

In view of this, implementations of the present disclosure are directed to a recommender system that enables web crawling and utilization of third-party data connectors, executes ML model training and builds ML/DL models for various recommendation use cases in the B2B context. As described in further detail herein, the recommender system of the present disclosure includes intelligent data enrichment, few-shot learning, multi-modal embedding, context integration, and multi-task evaluation. In some examples, intelligent data enrichment is provided using an ensemble of data enrichment modules to enrich the first-party data with industry data, uniform resource locator (URL) fill rate, external dictionaries, crawl data, and the like. In some examples, few-shot learning is used by applying meta learning algorithms to learn global parameters of a recommender network, where the (learned) global parameters are used to guide configurations for enterprises with few past interactions (e.g., sparse data, cold start). In some examples, multi-modal learning of embeddings captures rich semantics of product and customer profiles to boost recommendation quality (e.g., particularly in the case of enterprises, for which little to no historical transaction data is available). In some examples, for context integration, auto-encoders are used to learn nonlinear correlations between contextual factors that are provided as input to the recommender network. In some examples, for multi-task evaluation, a loss function in the recommender network is formulated as a weighted multi-objective cost function and is optimized against multiple policies (e.g., contribution margin, revenue, etc.).

FIG. 1 depicts an example system 100 that can execute implementations of the present disclosure. The example system 100 includes a computing device 102, a back-end system 108, and a network 106. In some examples, the network 106 includes a local area network (LAN), wide area network (WAN), the Internet, or a combination thereof, and connects web sites, devices (e.g., the computing device 102), and back-end systems (e.g., the back-end system 108). In some examples, the network 106 can be accessed over a wired and/or a wireless communications link.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end system 108 includes at least one server system 112, and data store 114 (e.g., database and knowledge graph structure). In some examples, the at least one server system 112 hosts one or more computer-implemented services that users can interact with using computing devices. For example, the server system 112 can host a recommender system in accordance with implementations of the present disclosure.

Implementations of the present disclosure are described in further detail herein with reference to an example use case that includes B2B. More particularly, implementations of the present disclosure are described with reference to recommending products (e.g., goods and/or services) from one company (business) for purchase by another company (business). For example, the multi-task recommender network of the present disclosure can be used by a supplier to determine one or more products that are to be recommended for purchase to a purchaser. It is contemplated, however, that implementations of the present disclosure can be applied in any appropriate use case.

Figure 2A:
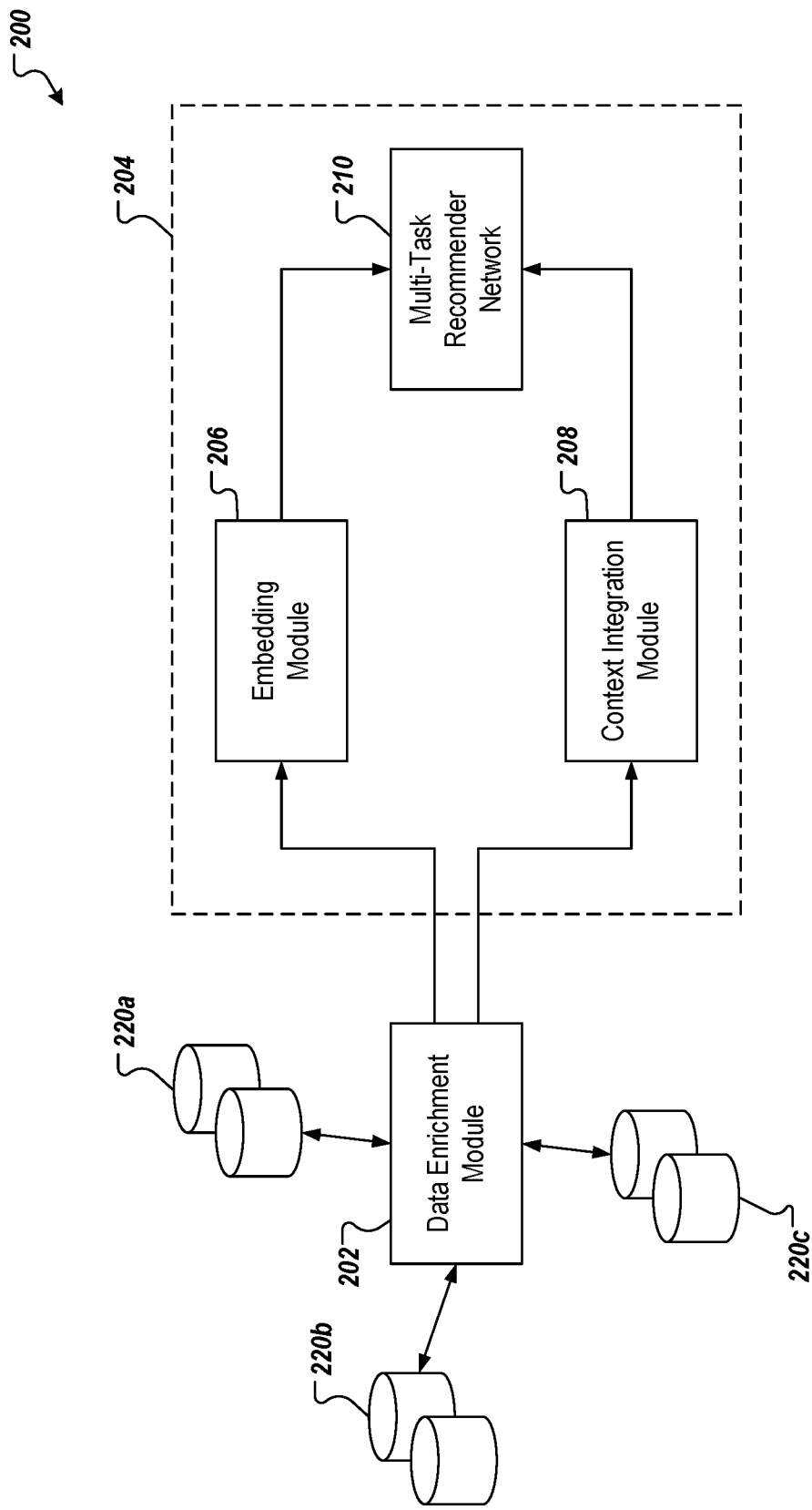
FIG. 2A depicts an example conceptual architecture including a recommender system in accordance with implementations of the present disclosure.

FIG. 2A depicts an example conceptual architecture 200 including a recommender system in accordance with implementations of the present disclosure. In FIG. 2, the example conceptual architecture 200 includes a data enrichment module 202 and a few-shot learning module 204. The few-shot learning module 204 includes an embedding module 206, a context integration module 208, and a multi-task recommender network 210. In some examples, the recommender system includes the data enrichment module 202 and the few-shot learning module 204. In the example of FIG. 2, one or more private data sources 220a, one or more public data sources 220b, and one or more entity data sources 220c are provided. In some examples, the recommender system includes the data enrichment module 202 and the few-shot learning module 204 and at least one of the data sources 220a, 220b, 220c.

In accordance with implementations of the present disclosure, data is retrieved from the data sources 220a, 220b, 220c. The retrieved data is representative of different attributes representing a customer (e.g., enterprise, company), different attributes representing a product, and attributes representative of context. Example attributes that represent a customer can include, without limitation, firmographic data (e.g., year founded, headquarters location, site location(s), number of employees, sales revenue, market cap, fiscal year, buying cycle) and financial health (e.g., credit score, financial runway, last funding date, expenses). Example attributes that represent a product can include, without limitation, product hierarchy, product category, and the like. In general, context describes conditions under which product recommendations are occurring. Context is dynamic with changes in economy, technology, organization, and the like. Such changes affect sales and purchase predictions of a company. Example attributes that represent a context can include, without limitation, hiring, layoffs, policy changes, and the like.

In some examples, each private data source 220a can record data that is private with respect to one or more entities (e.g., customers). For example, and from a supplier perspective, a private data source can record data that is representative of internal information on products supplied by and/or customers of a particular enterprise. As another example, and from a purchaser perspective, a private data source can record data that is representative of products purchases by and/or suppliers of a particular enterprise. In some examples, access to a private data source is limited (e.g., a purchaser only has access to their private data source, a supplier only has access to their private data source). In some examples, each public data source 220b can record data that is provided from public data sources. Examples of public data sources include customer websites and news websites. For example, a customer can maintain a publicly viewable web site, which can be crawled using a web crawler to glean data regarding the customer. As another example, a news outlet can maintain a publicly viewable website, which can be crawled using a web crawler to glean data regarding a customer. As another example, a governmental agency can maintain a publicly viewable website, which can be crawled using a web crawler to glean data regarding the customer (e.g., United States Patent & Trademark Office (USPTO) listing patents owned by the customer, filings with the US Securities and Exchange Commission (SEC), court websites). In some examples, each entity data source 220c can record data that is proprietary to an entity that manages the entity data source. For example, third parties provide can assemble data regarding customers and can make the data available for a fee (e.g., the V12 Data Platform).

In some examples, the data enrichment module 202 generates customer datasets and product data sets based on data provided from each of the data sources 220a, 220b, 220c. For example, and as introduced above, data can include first-party data representative of a customer and retrieved by crawling websites (e.g., customer product pages, USPTO pages). In some examples, the data enrichment module 202 cleans the first-party data and enriches first-party data with industry data (e.g., from the V12 Data Platform), URL fill rate, external dictionaries, crawl data, and the like. For example, and as described in further detail herein, dataset descriptions (e.g., for a customer dataset and a product dataset) are provided and one or more knowledge graphs (KGs) are constructed. In some examples, and as described in further detail herein, the embedding module 206 executes multi-modal learning of embeddings (e.g., structural, textual, categorical) that capture rich semantics of product and customer profiles to boost recommendation quality (e.g., particularly in the case of enterprises, for which little to no historical transaction data is available).

In further detail, data from each of the data sources 220a, 220b, 220c can be processed to provide structural data, textual data, and categorical data. In some examples, the structural data is representative of entities recorded in one or more of the data sources 220a, 220b, 220c and relationships between entities. The structural data can be recorded in one or more KGs, described in further detail herein. In some implementations, a KG can be generated and maintained (e.g., periodically updated) to represent companies, relationships between companies, relationships between a company and locations, relationships between companies and industries, relationships between companies and products, relationships between products and descriptions (e.g.,) and/or code names, among other possible relationships. In some examples, the textual data includes text (e.g., character strings) recorded in data of one or more of the data sources 220a, 220b, 220c. In some examples, the categorical data includes categories represented within data of one or more of the data sources 220a, 220b, 220c.

A KG can be described as a collection of data and related based on a schema representing entities and relationships between entities. The data can be logically described as a graph (even though also provided in table form), in which each distinct entity is represented by a respective node, and each relationship between a pair of entities is represented by an edge between the nodes. Each edge is associated with a relationship and the existence of the edge represents that the associated relationship exists between the nodes connected by the edge. For example, if a node A represents a company Alpha, a node B represents a product Beta, and an edge E is associated with the relationship "is manufactured by," then having the edge E connect the nodes in the direction from node A to node B in the graph represents the fact that Alpha is the company that manufactures Beta. In some examples, the knowledge graph can be enlarged with schema-related knowledge (e.g., Alpha is a concept Company, Charlie is a concept Company, and "supplies to" is a property or relationship between two entities/instances of concept Company). Adding schema-related information supports evaluation of reasoning results. A knowledge graph can be represented by any of a variety of physical data structures. For example, a knowledge graph can be represented by triples that each represent two entities in order, and a relationship from the first to the second entity; for example, [alpha, beta, is manufactured by], or [alpha, is manufactured by, beta], are alternative ways of representing the same fact. Each entity and each relationship can be, and generally will be, included in multiple triples.

In some examples, each entity can be stored as a node once, as a record or an object, for example, and linked through a linked list data structure to all the relationships the entity has, and all the other entities to which the entity is related. More specifically, a knowledge graph can be stored as an adjacency list in which the adjacency information includes relationship information. In some examples, each distinct entity and each distinct relationship are represented with respective, unique identifiers. The entities represented by a knowledge graph need not be tangible things or specific people. The entities can include particular people, places, things, artistic works, concepts, events, or other types of entities. Thus, a knowledge graph can include data defining relationships between companies (e.g., suppliers along a supply chain); data defining relationships between companies and things (e.g., a particular product produced by a particular company); data defining relationships between places and things (e.g., a particular product comes from a particular geographic location); data defining relationships between companies and places (e.g., a company is headquartered in a particular city); and other kinds of relationships between entities.

In some implementations, each node has a type based on the kind of entity the node represents; and the types can each have a schema specifying the kinds of data that can be maintained about entities represented by nodes of the type and how the data should be stored. For example, a node of a type for representing a company could have a schema defining fields for information such as location, industry, and so on. Such information can be represented by fields in a type-specific data structure, or by triples that look like node-relationship-node triples (e.g., [company identifier, is located, in industry]), or in any other convenient predefined way. In some examples, some or all of the information specified by a type schema can be represented by links to nodes in the knowledge graph; for example, [one company identifier, subsidiary of, another company identifier], where the other company identifier is a node in the graph.

In some examples, the context integration module 208 uses auto-encoders to learn nonlinear correlations between contextual factors that are provided as input to the recommender network. For example, an auto-encoder neural network is trained (e.g., offline) using, for example, back propagation and gradient descent algorithm with a mean squared error (MSE) loss function, and a latent context vector is extracted from an intermediate layer of the auto-encoder, which is low dimensional representation of the input to the auto-encoder. In some examples, the multi-task recommender network 210 is trained using few-shot learning. For example, and as described in further detail herein, few-shot learning is used by applying meta learning algorithms to learn a global parameter of the recommender network, where the (learned) global parameter is used to guide configurations for enterprises with few past interactions (e.g., sparse data, cold start). In some examples, for multi-task evaluation, a loss function in the recommender network is formulated as a weighted multi-objective cost function and is optimized against multiple policies (e.g., contribution margin, revenue, etc.).

Figure 2B:
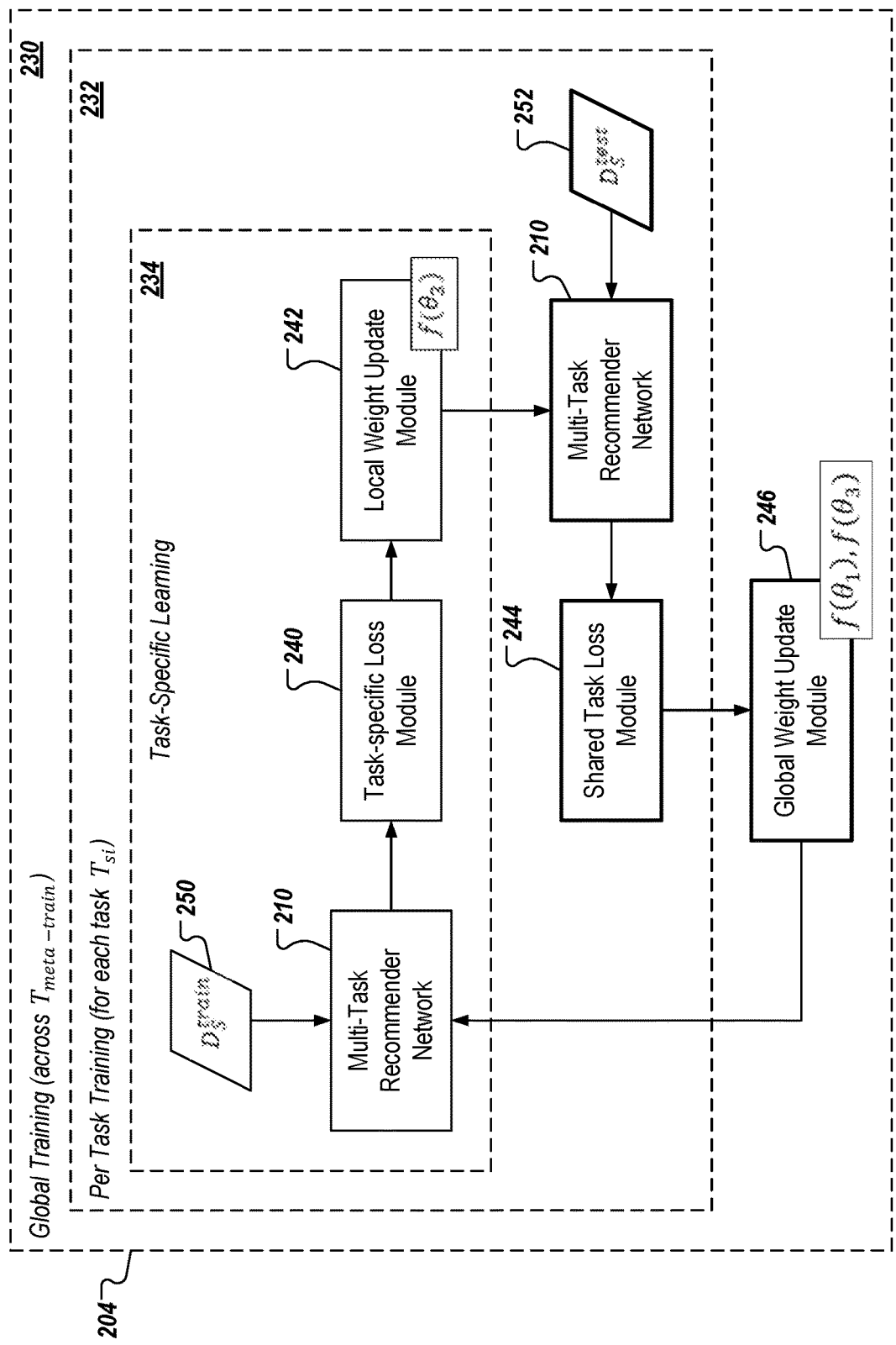
FIG. 2B depicts a conceptual representation of few-shot learning in accordance with implementations of the present disclosure.

FIG. 2B depicts a conceptual representation of few-shot learning in accordance with implementations of the present disclosure. In the example of FIG. 2, the few-shot learning module 204 of FIG. 2A executes global training 230 that includes per task training 232 and task-specific learning 234. In the example of FIG. 2B, a training dataset ($D_S^{train}$) 250 (referred to as a support set) is used to train the recommender network 210 and a test dataset ($D_S^{test}$) 252 (also referred to as a query set) is used to test the (trained) recommender network 210 at each iteration of training (few-shot learning). In the example of FIG. 2B, a task-specific loss module 240, a local weight update module 242, a shared task loss module 244, and a global weight update module 246 are provided.

For training, a set of data ($Data_{total}$) is divided into a set of training tasks ($T_{meta-train}$). In some examples, each training task ($T_{si}$) corresponds to a respective scenario, such as a particular product or user centric or a particular scenario such a higher-level category. For example:

$$T_s \in T_{meta-train}, T_s = \{D_S^{train}, D_S^{test}\}$$

In few-shot learning a set of parameters are optimized, such that when a gradient step is taken with respect to a particular task ($T_{si}$), the parameters $\theta_3$ are dose to the optimal parameters for the task ($T_{si}$). Here, the task is a particular scenario (e.g., company-to-product). The parameters $\theta_3$ correspond to task-specific output layers of the multi-task recommender network that is being trained. Accordingly, an objective of few-shot learning is to learn an internal feature that is broadly applicable to all tasks, rather than a single task. During the local update, the parameters $\theta_3$ of the multi-task recommender network are adjusted on each support set (set of training data. During the global update the parameters $\theta_1$ of the multi-task recommender network to minimize the loss. As depicted in FIG. 2B, the components in bolded line represent the global update and the non-bolded components represent the local update. Accordingly, FIG. 2B illustrates the concept of training the multi-task recommender network using double backpropagation (gradient descent), such that the multi-task recommender network is optimized both locally and globally. As depicted in FIG. 2B, the loss for the local update is computed using the support set ($D_S^{train}$) and then, using those weights, the loss for the global update is calculated using the query set ($D_S^{test}$) with further optimizing/updating of these weights.

Figure 3:
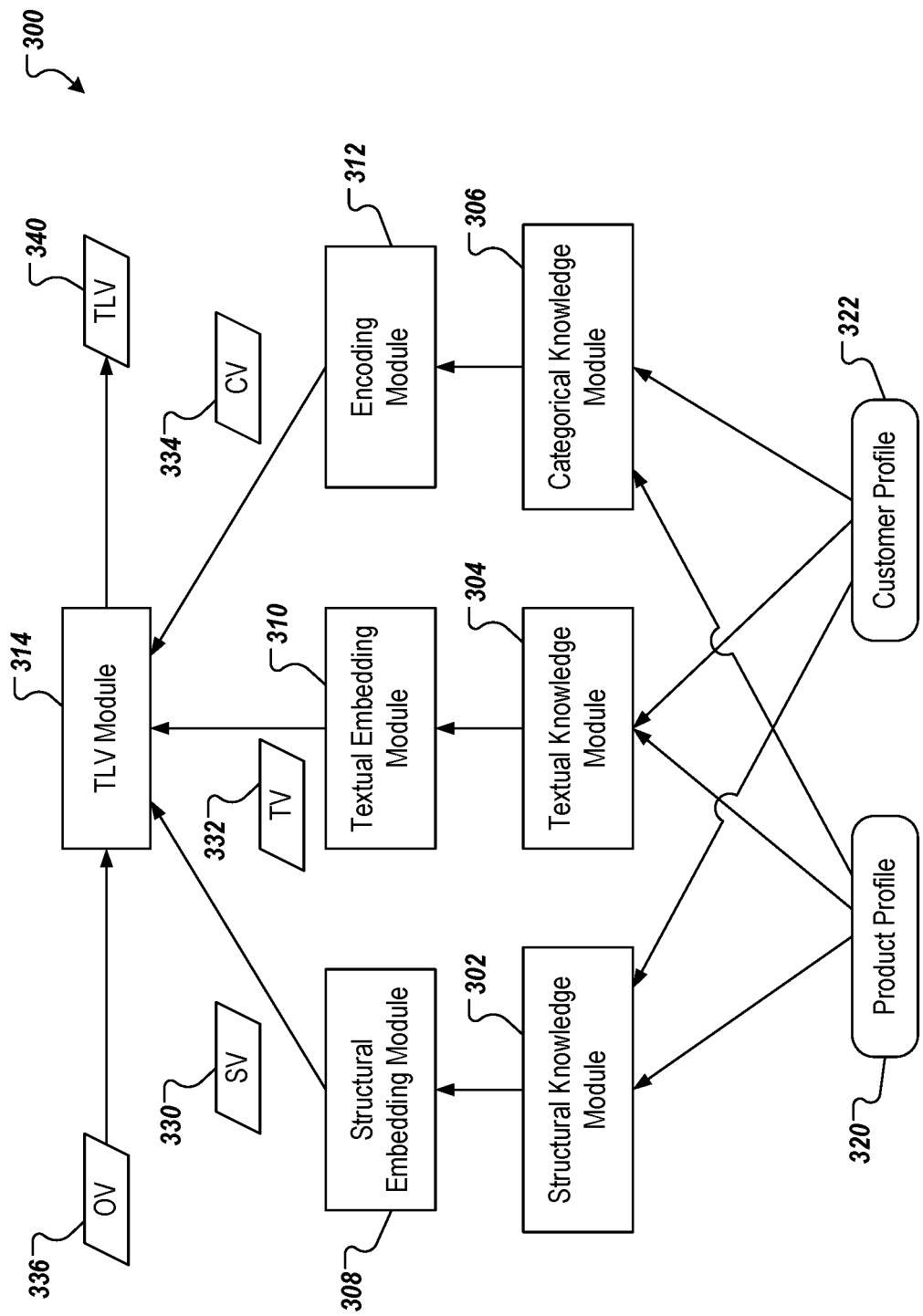
FIG. 3 depicts an example conceptual architecture representative of multi-modal embedding in accordance with implementations of the present disclosure.

FIG. 3 depicts an example conceptual architecture 300 representative of multi-modal embedding in accordance with implementations of the present disclosure. The example of FIG. 3 depicts operation of the embedding module 206 of FIG. 2, which integrates collaborative filtering with different semantic representations from heterogenous information networks (e.g., the data sources 220a, 220b, 220c) in addition to the textual content, structural content, and categorical content provided from product profile and company profile.

The example conceptual architecture 300 of FIG. 3 includes a structural knowledge module 302, a textual knowledge module 304, a categorical knowledge module 306, a structural embedding module 308, a textual embedding module 310, an encoding module 312, and a total latent vector (TLV) module 314.

In some examples, the structural knowledge module 302 extracts structural data from a product profile 320 and a customer profile 322 and provides the structural data to the structural embedding module 308. For example, structural data can be provided from a KG that represents entities and relationships between entities in terms of nodes and edges, as described herein. In some examples, the structural embedding module 308 processes the structural data to generate a structural embedding provided as a structural vector (SV) 330. For example, and without limitation, the structural embedding module 308 can process the structural data using an embedding technique, such as a graph convolution network (GCN). In general, a GCN receives a graph, such as a KG, as input and generates an embedding as a representation of the structure of the graph. Here, the embedding is provided as the SV 330, which is a multi-dimensional vector.

In some examples, the textual knowledge module 304 extracts textual data from the product profile 320 and the company profile 322 and provides the textual data to the textual embedding module 310. In some examples, the textual embedding module 310 processes the textual data to generate a textual embedding provided as a textual vector (TV) 332. For example, and without limitation, the textual embedding module 310 can process the structural data using an embedding technique, such as Bidirectional Encoder Representations from Transformers (BERT). In general, a BERT model receives the textual data as input and generates an embedding as a representation of the textual data. Here, the embedding is provided as the TV 332, which is a multi-dimensional vector.

In some examples, the categorical knowledge module 306 extracts category data from the product profile 320 and the company profile 322 and provides the category data to the encoding module 312. In some examples, the encoding module 312 processes the category data to generate a categorical embedding provided as a categorical vector (CV) 334. For example, and without limitation, the encoding module 312 can process the categorical data using an encoding technique, such as one-hot encoding. In general, a one-hot encoder receives categorical data as input and generates an encoding as a representation of the categorical data. Here, the encoding is provided as the CV 334, which is a multi-dimensional vector.

While GCNs, BERT, and one-hot encoding are discussed herein, it is contemplated that any appropriate embedding technique and/or encoding technique can be used to provide the vectors.

In some examples, the TLV module 314 processes the SV 330, the TV 332, and the CV 334 to provide a total latent vector (TLV) 340. In some examples, processing of the SV 330, the TV 332, and the CV 334 includes concatenating the SV 330, the TV 332, and the CV 334. In some instances, the SV 330, the TV 332, and the CV 334 can be of different dimensionalities. Consequently, each can be reduced to a dense format of common dimensionality prior to concatenation.

In some implementations, an offset vector (OV) 336 contributes to the TLV 340 (e.g., is also included in the concatenation). In some examples, the OV 336 is provided from a collaborative matrix factorization. For example, a recommendation system can include historical data representative of customers and products, where each customer has purchased one or more products. The historical data can be represented as a matrix of customers and products. The matrix can be processed as a logistic regression problem for each customer in view of a loss function, where inputs are the description vectors of the products. By minimizing the loss function, customer embeddings can be provided for each customer. The resulting customer embedding, for a particular customer, can be provided as the OV 336 for the customer represented in the customer profile 322. Here, the OV 336 functions as a baseline representation of a respective customer based on historical data, and the OV 336 is augmented by the SV 330, the TV 332, and the CV 334 in the TLV 340.

Figure 4:
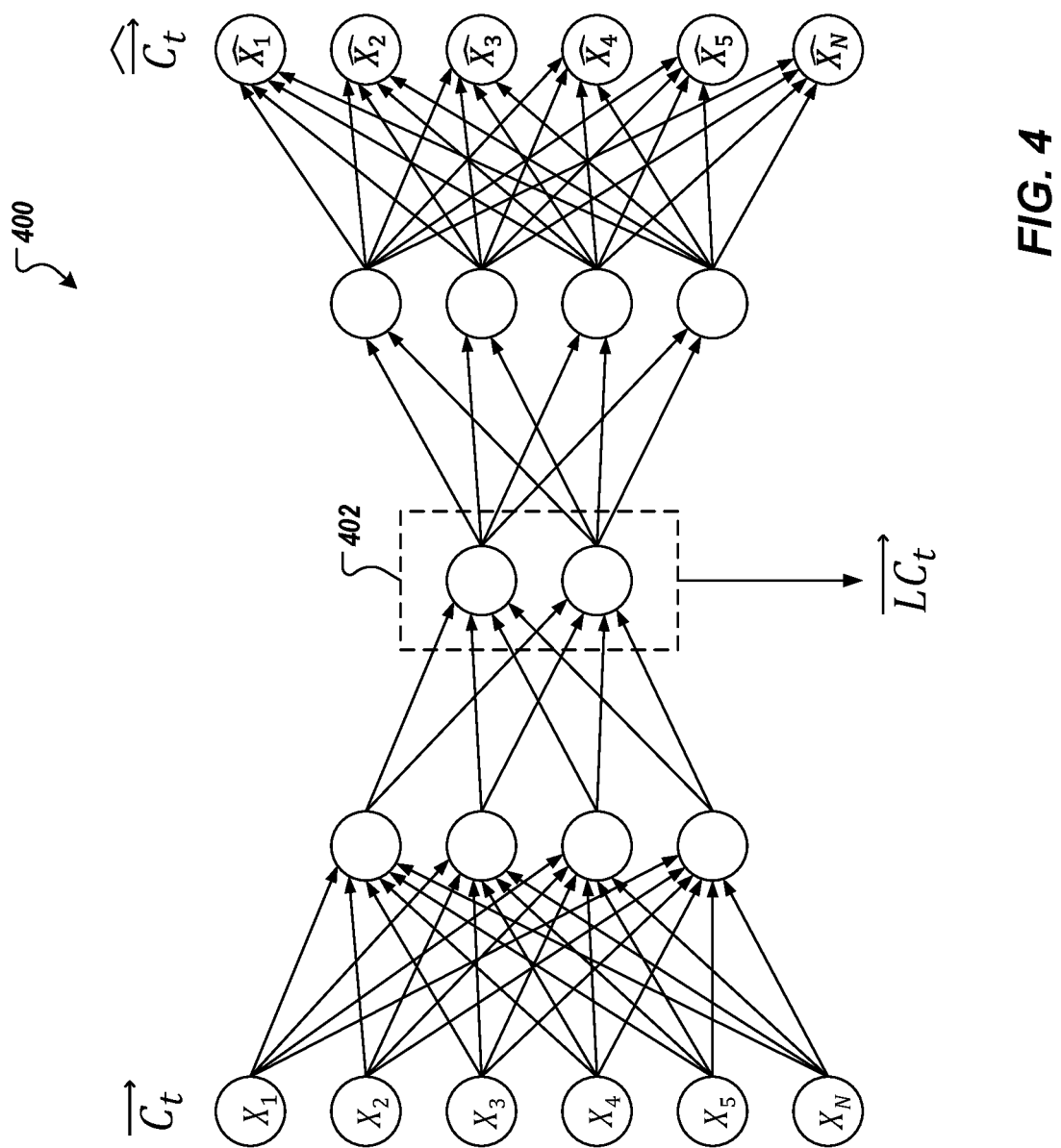
FIG. 4 depicts an example representation of selection of a latent context vector for context integration in accordance with implementations of the present disclosure.

FIG. 4 depicts an example representation of selection of a latent context vector for context integration in accordance with implementations of the present disclosure. More particularly, FIG. 4 depicts at least a portion of an auto-encoder 400, which includes an intermediate layer 402 that provides a latent context vector ($\overrightarrow{LC_t}$). The example of FIG. 4 depicts operation of the context integration module 208 of FIG. 2, which provides the latent context vector ($\overrightarrow{LC_t}$) to represent dynamic context (introduced above) in influencing recommendations output by the multi-task recommender network 210.

In further detail, and as discussed above, product recommendations can depend on additional contextual evidence such as, for example and without limitation, changing technology infrastructure, financial health, government support, competitive pressures, vendor support, economic changes, and the like. Such contextual factors are often correlated, and it is difficult to directly learn a relationship to a final destination variable y. In view of this, implementations of the present disclosure use an auto-encoder (e.g., as depicted in FIG. 4) to discover correlations between different context features and extract the correlations in a relatively low-dimensional representation, namely, the latent context vector ($\overrightarrow{LC_t}$).

In general, the auto-encoder is a neural network that can be described as an unsupervised learning algorithm that applies backpropagation, setting the target values as equal to the inputs. In the example of FIG. 4, a context vector ($\overrightarrow{C_t}$) includes $X_N$ context features and is provided as input to the auto-encoder 400. In general, the context vector can be relatively large in terms of dimension (i.e., N is a relatively large number, N≥100). By using an auto-encoder, the deep layers reveal the correlations and the patterns and are translated to latent context represented in the latent context vector ($\overrightarrow{LC_t}$). In some examples, the auto-encoder is trained offline separately using back propagation and gradient descent algorithm and a MSE loss function. The latent context vector ($\overrightarrow{LC_t}$) is extracted from the intermediate layer and is a low dimensional representation of the input (e.g., lower dimensions than the input).

Figure 5:
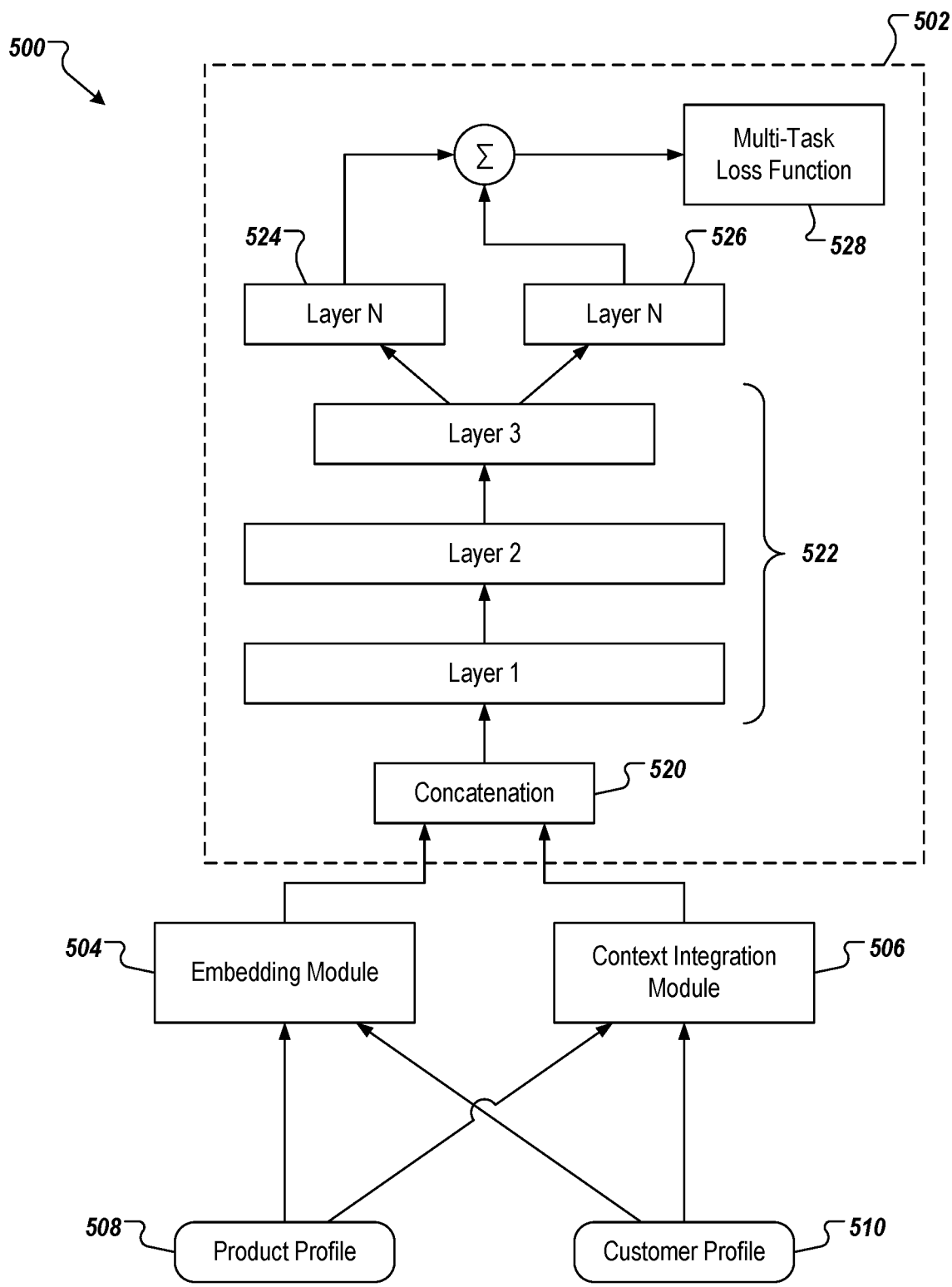
FIG. 5 depicts a conceptual representation of a multi-task recommender network in accordance with implementations of the present disclosure.

FIG. 5 depicts a conceptual representation 500 of training of a multi-task recommender network 502 (e.g., the recommender network 210 of FIG. 2) in accordance with implementations of the present disclosure. In the example of FIG. 5, the conceptual representation 500 also includes an embedding module 504 (e.g., the embedding module 206 of FIG. 2) and a context integration module 506 (e.g., the context integration module 206 of FIG. 2). In some implementations, the embedding module 504 processes a product profile 508 and a customer profile 510, each of which is provided from a data enrichment module (e.g., the data enrichment module 202 of FIG. 2A). In some examples, the embedding module 504 provides a TLV (e.g., as described herein with reference to FIG. 3) as input to the multi-task recommender network 502. In some examples, the context integration module 506 provides a latent context vector (e.g., as described herein with reference to FIG. 4) as input to the multi-task recommender network 502.

In general, a ML model is iteratively trained, where, during an iteration, one or more parameters of the ML model are adjusted, and an output is generated based on the training data. For each iteration, a loss value is determined based on a loss function. As described in further detail herein, implementations of the present disclosure use multiple loss functions (e.g., embodied in the multi-task loss function). The loss value represents a degree of accuracy of the output of the ML model. The loss value can be described as a representation of a degree of difference between the output of the ML model and an expected output of the ML model (the expected output being provided from training data). In some examples, if the loss value does not meet an expected value (e.g., is not equal to zero), parameters of the ML model are adjusted in another iteration of training. In some instances, this process is repeated until the loss value meets the expected value. In general, during training there is a many-to-many relationship between customer profiles and product profiles in the training data. That is, multiple customer profiles and multiple product profiles are used for training.

In the context of implementations of the present disclosure, training includes training of embedders of the embedding module and training of the recommender network. In accordance with implementations of the present disclosure, few-shot learning includes concurrent training of network parameters of the embedding module (e.g., $f(\theta_1)$) and training of network parameters of the recommender network (e.g., $f(\theta_3)$). In some examples, and as represented ion FIG. 2B, during local update, the network parameters $\theta_3$ are updated, and during global update, the network parameters $\theta_1$ and the network parameters $\theta_3$ are updated.

In further detail, the multi-task recommender network 502 is trained to account for multiple tasks, or optimizations. Example optimizations can include, without limitation, product relevance, maximizing profit margin, maximizing volume, contribution margin, maximizing revenue, and minimizing diversity (e.g., diversity in products recommended to customers). Consequently, the multi-task recommender network 502 is trained with a view to optimize multiple tasks (optimization goals). To achieve this, multiple loss functions are implemented within the multi-task loss function 528, a loss function for each optimization task. In some examples, loss functions can include ranking loss and similarity-based loss. Example loss functions can include, without limitation, margin ranking loss (e.g., product relevance), triplet loss (e.g., similarity), and MSE (e.g., profit margin). Although example loss functions are described herein, it is appreciated that implementations of the present disclosure can be realized using any appropriate loss function. An example multi-task loss function can be provided as:

$$L_n = \text{minimize}(L^1(\theta_{shared}, \theta_{task1}), L^2(\theta_{shared}, \theta_{task2}), L^3(\theta_{shared}, \theta_{task3}))$$

where $L^n$ can be a task-specific (i.e., specific to an optimization goal) loss function (e.g., pairwise ranking loss function, triplet loss, MSE), $\theta_{shared}$ is network common to all the losses, and $\theta_{task}$ is specific to the individual loss.

In the example of FIG. 5, the multi-task recommender network 502 includes a concatenation layer 520, a set of layers 522 (e.g., although 3 layers are depicted, more layers can be included), output layers 524, 526, and a multi-task loss function 528. The concatenation layer 520 receives the TLV from the embedding module 504 (multi-modal embedding described herein with reference to FIG. 3) and the latent context vector ($\overrightarrow{LC_t}$) from the context integration module 506 (described herein with reference to FIG. 4). The concatenation module 520 concatenates the TLV and the $\overrightarrow{LC_t}$ to provide a concatenated vector that is input to the set of layers 522. In some examples, before concatenating the TLV and the $\overrightarrow{LC_t}$, one or both are processed to bring their respective values to a fixed range having appropriate dimensions. In some examples, pre-processing can include any appropriate normalization technique (e.g., MinMaxScaler).

In accordance with implementations of the present disclosure, the multi-task recommender network 502 includes multiple output layers (e.g., the output layers 524, 526 as depicted in FIG. 5), each output layer corresponding to a respective optimization goal. For example, the output layer 524 can correspond to a first optimization goal (e.g., maximize profit margin) and the output layer 526 can correspond to a second optimization goal (e.g., minimize diversity in product recommendations). Although two output layers are depicted in FIG. 5, it is contemplated that any appropriate number of output layers can be provided depending on the number of optimization goals. As depicted in FIG. 5, each output layer 524, 526 shares the output of the set of layers 522. That is, the output of the last layer in the set of layers 522 is provided as input to each of the output layers 524, 526. In some examples, each output layer 524, 526 can be any appropriate type of output layer depending on the respective optimization goal. Example types of output layers can include, without limitation, a sigmoid function and a linear layer.

In some implementations, outputs of the output layers 524, 526 are summed as a weighted sum. That is, a weight is applied to the output of each output layer 524, 526 and a weighted sum is provided. In some examples, the weights adjust the influence the respective outputs have in training. That is, for example, not all optimization tasks may be considered equal, some more important than others. Consequently, the weights enable more important optimization goals to influence the resulting loss value more than less important optimization goals. For example, maximizing profit diversity can be more important than minimizing profit margin. Consequently, a weight applied to the output layer corresponding to profit margin can be greater than a weight applied to the output layer corresponding to product diversity. In some examples, the multi-task loss function 528 determines an overall loss value for the multi-task recommender network 502 and selectively continues training based on the overall loss value (e.g., executes a next iteration of training to further minimize the overall loss value).

As introduced above, implementations of the present disclosure use few-shot learning to train the multi-task recommender network 502. In general, few-shot learning can be described as a technique for training a ML model, in this case, the multi-task recommender network 502, using a relatively small amount of training data. Few-shot learning can also be described as a type of meta-learning, during which a ML model is trained on several related tasks during the meta-training phase. For example, during few-shot learning, the ML model is trained to learn a common representation for various tasks and task-specific classifiers are trained on top of the common representation. After training using few-shot learning, a ML model is able to recognize and classify new data (e.g., data not represented in the training data). Accordingly, implementations of the present disclosure leverage few-shot learning to address data sparsity (i.e., relatively little training data available) as well as cold-start (i.e., new data not included in the training data).

Figure 6:
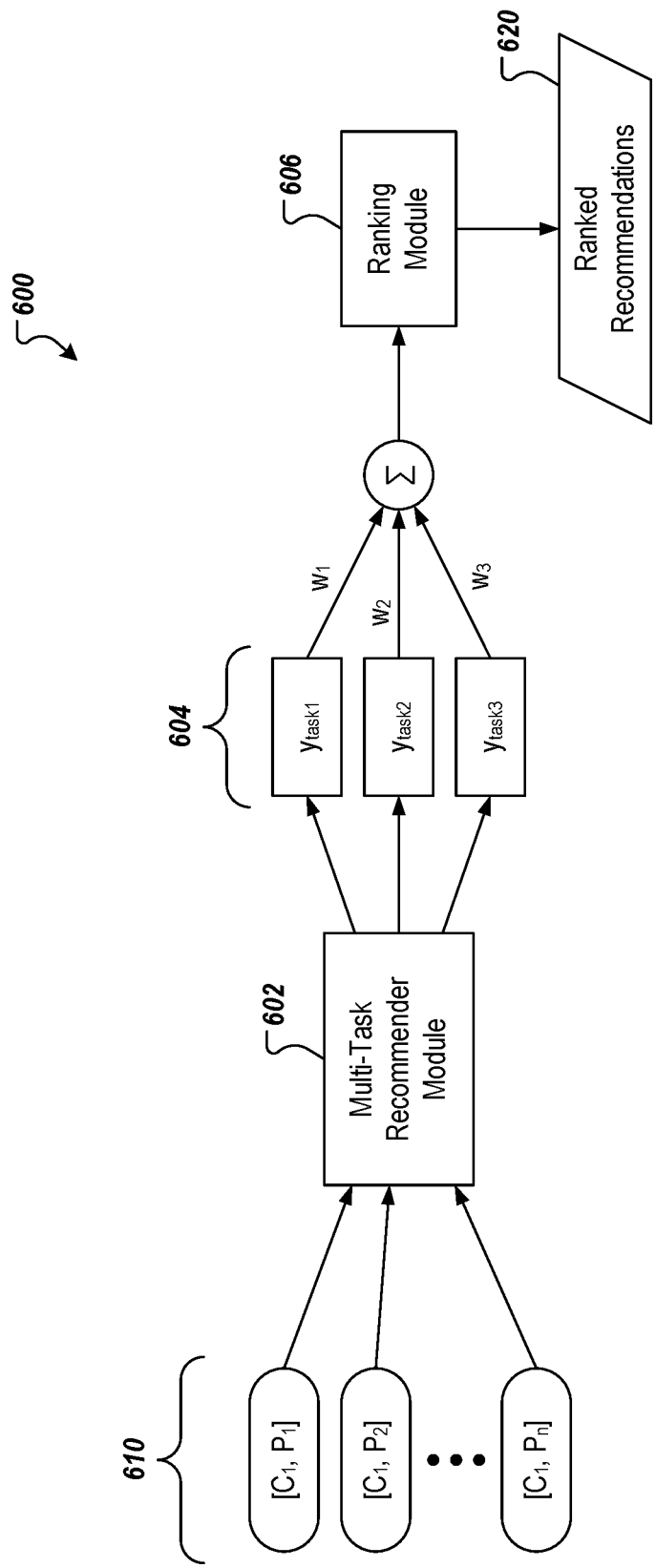
FIG. 6 depicts a representation of a recommendation workflow in accordance with implementations of the present disclosure.

FIG. 6 depicts a representation of a recommendation workflow 600 in accordance with implementations of the present disclosure. More particularly, the example of FIG. 6 represents post-training use of the (trained) multi-task recommender network to provide recommendations (i.e., inference phase). In the example of FIG. 6, the representation includes a multi-task recommender module 602, a set of tasks 604, and a ranking module 606.

The multi-task recommender module 602 executes a (trained) multi-task recommender network (e.g., the multi-task recommender network 502 of FIG. 5 after training). In some examples, the multi-task recommender module 602 receives a set of inputs 610, each input including a customer and product pair (e.g., tuple [$C_1$, $P_i$] representing a customer $C_1$ and a product $P_i$ in a set of products {$P_1$, . . . , $P_n$}). In some examples, the set of products includes all products in a database of products, which would be available for offer to the customer $C_1$. The multi-task recommender module 602 outputs a set of scores {$y_{task1}$, . . . , $y_{taskn}$}, each score $y_{taski}$ associated with a respective tuple [$C_1$, $P_i$] and being determined by the multi-task loss function. In some examples, each score represents a respective optimization goal. The scores of the individual loss function are summed to output a total score for each tuple that is provided to the ranking module 606. During summation, weights (w) can also be introduced to enable different losses to have different influences on the total score. Accordingly, each tuple is processed individually by the multi-task recommender module 602 to provide a respective total score to the ranking module 606. The ranking module 606 sorts and ranks the tuples based on total score to provide a set of ranked recommendations 620 as output. The set of ranked recommendations represents products that could be recommended to the customer $C_1$.

Figure 7:
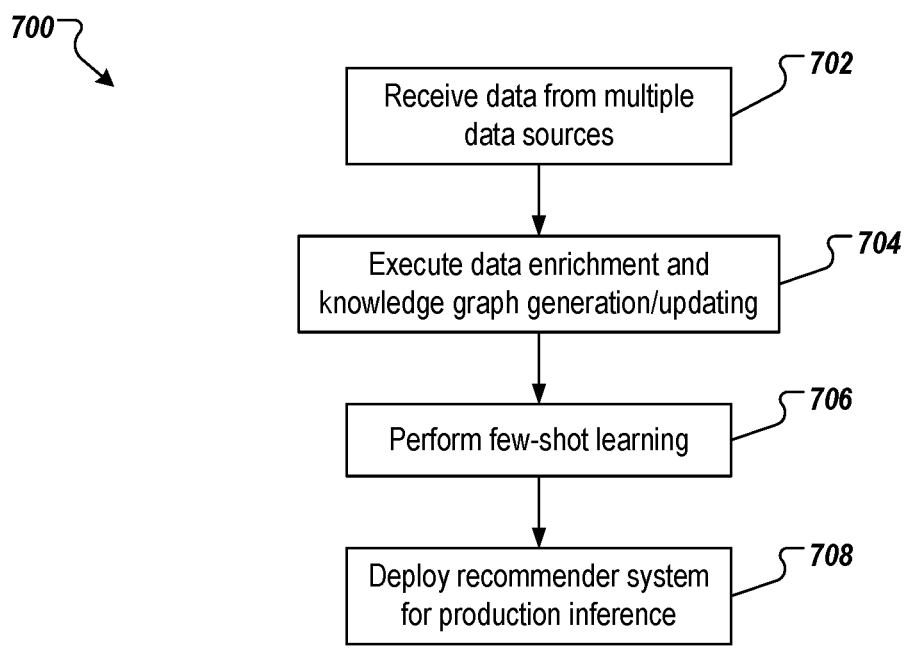
FIG. 7 depicts an example process in accordance with implementations of the present disclosure.

FIG. 7 depicts an example process 700 that can be executed in implementations of the present disclosure. In some examples, the example process 700 is provided using one or more computer-executable programs executed by one or more computing devices.

Data from multiple data sources is received (702). For example, and as described in detail herein, data is received from the data sources 220a, 220b, 220c of FIG. 2A and is representative of different attributes representing a customer (e.g., enterprise, company), different attributes representing a product, and attributes representative of context. In some examples, each private data source 220a can record data that is private with respect to one or more entities (e.g., customers), each public data source 220b can record data that is provided from public data sources, and each entity data source 220c can record data that is proprietary to an entity that manages the entity data source. Data enrichment and KG generation (or updating) are executed (704). For example, and as described in detail herein, the data enrichment module 202 generates customer datasets and product data sets based on data provided from each of the data sources 220a, 220b, 220c. In some examples, the data enrichment module 202 cleans the first-party data and enriches first-party data with industry data (e.g., from the V12 Data Platform), URL fill rate, external dictionaries, crawl data, and the like. For example, dataset descriptions (e.g., for a customer dataset and a product dataset) are provided and one or more KGs are constructed and/or updated (e.g., an existing KG is updated based on recently received data).

Few-shot learning is executed to train a multi-task recommender network (706). For example, and as described in detail herein, training includes training of embedders of the embedding module and training of the recommender network. In accordance with implementations of the present disclosure, few-shot learning includes concurrent training of network parameters of the embedding module (e.g., f($\theta_1$)) and training of network parameters of the recommender network (e.g., f($\theta_3$)). In some examples, and as represented ion FIG. 2B, during local update, the network parameters $\theta_3$ are updated, and during global update, the network parameters $\theta_1$ and the network parameters $\theta_3$ are updated. As described herein, the multi-task recommender network is trained to account for multiple tasks, or optimizations. Example optimizations can include, without limitation, product relevance, maximizing profit margin, maximizing volume, contribution margin, maximizing revenue, and minimizing diversity (e.g., diversity in products recommended to customers). Consequently, the multi-task recommender network is trained with a view to optimize multiple tasks (optimization goals). To achieve this, multiple loss functions are implemented within the multi-task loss function, a loss function for each optimization task.

The (trained) multi-task recommender network is deployed for production use (708). For example, and as described in detail herein, the multi-task recommender module 602 executes a (trained) multi-task recommender network (e.g., the multi-task recommender network 502 of FIG. 5 after training). In some examples, the multi-task recommender module 602 receives a set of inputs 610, each input including a customer and product pair (e.g., tuple [$C_1$, $P_i$] representing a customer $C_1$ and a product $P_i$ in a set of products {$P_1$, . . . , $P_n$}). In some examples, each tuple is processed individually by the multi-task recommender module 602 to provide a respective total score to the ranking module 606. The ranking module 606 sorts and ranks the tuples based on total score to provide a set of ranked recommendations 620 as output. The set of ranked recommendations represents products that could be recommended to the customer $C_1$.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for providing recommendations from a computer-implemented recommender system, the method comprising:
receiving a set of tuples, each tuple comprising an entity and a product from a set of products;
for each tuple:
generating, by an embedding module, a total latent vector as input to a recommender network, the total latent vector generated based on embeddings provided as representations of data from a product profile of a respective product and an entity profile of the entity, the representations including a structural vector, a textual vector, and a categorical vector, each embedding generated based on processing data from the product profile of the respective product and the entity profile of the entity,
generating, by a context integration module, a latent context vector based on a context vector representative of a context of the entity, and
inputting the total latent vector and the latent context vector to the recommender network, the recommender network including multiple output layers and trained by few-shot learning using a multi-task loss function, wherein each output layer corresponds to a respective task in a set of tasks and includes parameters that are optimized for the respective task during few-shot learning, wherein the multi-task loss function includes a set of loss functions, each loss function also corresponding to a respective task in the set of tasks, wherein during a local update the parameters of the recommender network are updated, and during a global update, parameters of the recommender network and the embedding module are updated, and wherein few-shot learning includes concurrent training of parameters of the recommender network and the embedding module; and
generating, by the trained recommender network, a prediction comprising a set of recommendations specific to the entity.

2. The method of claim 1, wherein the recommender network comprises a concatenation layer to concatenate the total latent vector and the latent context vector to provide a concatenated vector for processing through a set of intermediate layers.

3. The method of claim 1, wherein the embedding module comprises a structural embedding module that generates a structural vector for a respective tuple by processing structural data of the product profile and the entity profile.

4. The method of claim 1, wherein the embedding module comprises a textual embedding module that generates a textual vector for a respective tuple by processing textual data of the product profile and the entity profile.

5. The method of claim 1, wherein the embedding module comprises an encoding module that generates a categorical vector for a respective tuple by processing category data of the product profile and the entity profile.

6. The method of claim 1, wherein generating a latent context vector comprises:
inputting the context vector to an auto-encoder, and
outputting the latent context vector from an intermediate layer of the auto-encoder.

7. The method of claim 6, wherein the latent context vector has fewer dimensions than the context vector.

8. The method of claim 1, wherein the total latent vector is further based on an offset vector provided as a baseline representation of the entity.

9. One or more non-transitory computer-readable storage media coupled to one or more processors and having instructions stored thereon which, when executed by the one or more processors, cause the one or more processors to perform operations for providing recommendations from a computer-implemented recommender system, the operations comprising:
receiving a set of tuples, each tuple comprising an entity and a product from a set of products;
for each tuple:
generating, by an embedding module, a total latent vector as input to a recommender network, the total latent vector generated based on embeddings provided as representations of data from a product profile of a respective product and an entity profile of the entity, the representations including a structural vector, a textual vector, and a categorical vector, each embedding generated based on processing data from the product profile of the respective product and the entity profile of the entity,
generating, by a context integration module, a latent context vector based on a context vector representative of a context of the entity, and
inputting the total latent vector and the latent context vector to the recommender network, the recommender network including multiple output layers and trained by few-shot learning using a multi-task loss function, wherein each output layer corresponds to a respective task in a set of tasks and includes parameters that are optimized for the respective task during few-shot learning, wherein the multi-task loss function includes a set of loss functions, each loss function also corresponding to a respective task in the set of tasks, wherein during a local update the parameters of the recommender network are updated, and during a global update, parameters of the recommender network and the embedding module are updated, and wherein few-shot learning includes concurrent training of parameters of the recommender network and the embedding module; and
generating, by the trained recommender network, a prediction comprising a set of recommendations specific to the entity.

10. The one or more non-transitory computer-readable storage media of claim 9, wherein the recommender network comprises a concatenation layer to concatenate the total latent vector and the latent context vector to provide a concatenated vector for processing through a set of intermediate layers.

11. The one or more non-transitory computer-readable storage media of claim 9, wherein the embedding module comprises a structural embedding module that generates a structural vector for a respective tuple by processing structural data of the product profile and the entity profile.

12. The one or more non-transitory computer-readable storage media of claim 9, wherein the embedding module comprises a textual embedding module that generates a textual vector for a respective tuple by processing textual data of the product profile and the entity profile.

13. The one or more non-transitory computer-readable storage media of claim 9, wherein the embedding module comprises an encoding module that generates a categorical vector for a respective tuple by processing category data of the product profile and the entity profile.

14. The one or more non-transitory computer-readable storage media of claim 9, wherein generating a latent context vector comprises:
   inputting the context vector to an auto-encoder, and
   outputting the latent context vector from an intermediate layer of the auto-encoder.

15. The one or more non-transitory computer-readable storage media of claim 14, wherein the latent context vector has fewer dimensions than the context vector.

16. The one or more non-transitory computer-readable storage media of claim 9, wherein the total latent vector is further based on an offset vector provided as a baseline representation of the entity.

17. A system, comprising:
   one or more processors; and
   a computer-readable storage device coupled to the one or more processors and having instructions stored thereon which, when executed by the one or more processors, cause the one or more processors to perform operations for providing recommendations from a computer-implemented recommender system, the operations comprising:
      receiving a set of tuples, each tuple comprising an entity and a product from a set of products;
      for each tuple:
         generating, by an embedding module, a total latent vector as input to a recommender network, the total latent vector generated based on embeddings provided as representations of data from a product profile of a respective product and an entity profile of the entity, the representations including a structural vector, a textual vector, and a categorical vector, each embedding generated based on processing data from the product profile of the respective product and the entity profile of the entity,
         generating, by a context integration module, a latent context vector based on a context vector representative of a context of the entity, and
         inputting the total latent vector and the latent context vector to the recommender network, the recommender network including multiple output layers and trained by few-shot learning using a multi-task loss function, wherein each output layer corresponds to a respective task in a set of tasks and includes parameters that are optimized for the respective task during few-shot learning, wherein the multi-task loss function includes a set of loss functions, each loss function also corresponding to a respective task in the set of tasks, wherein during a local update the parameters of the recommender network are updated, and during a global update, parameters of the recommender network and the embedding module are updated, and wherein few-shot learning includes concurrent training of parameters of the recommender network and the embedding module; and
      generating, by the trained recommender network, a prediction comprising a set of recommendations specific to the entity.

18. The system of claim 17, wherein the recommender network comprises a concatenation layer to concatenate the total latent vector and the latent context vector to provide a concatenated vector for processing through a set of intermediate layers.

19. The system of claim 17, wherein the embedding module comprises a structural embedding module that generates a structural vector for a respective tuple by processing structural data of the product profile and the entity profile.

20. The system of claim 17, wherein the embedding module comprises a textual embedding module that generates a textual vector for a respective tuple by processing textual data of the product profile and the entity profile.

21. The system of claim 17, wherein the embedding module comprises an encoding module that generates a categorical vector for a respective tuple by processing category data of the product profile and the entity profile.

22. The system of claim 17, wherein generating a latent context vector comprises:
   inputting the context vector to an auto-encoder, and
   outputting the latent context vector from an intermediate layer of the auto-encoder.

23. The system of claim 22, wherein the latent context vector has fewer dimensions than the context vector.

24. The system of claim 17, wherein the total latent vector is further based on an offset vector provided as a baseline representation of the entity.

* * * * *